Dec. 22, 1964  V. A. ALTOVSKY ETAL  3,162,852
RADAR APPARATUS

Filed Feb. 25, 1959  2 Sheets-Sheet 2

|  | | T1 | T2 | T3 | T4 | T5 | T6 |
|---|---|---|---|---|---|---|---|
|  | | •$I_4$ | | | | | |
|  | | •$I_3$ | •$I_4$ | | | | |
|  | | •$I_2$ | •$I_3$ | •$I_4$ | | | |
| I | 14 | -✕-$I_1$ | -✕-$I_2$ | -✕-$I_3$ | -✕-$I_4$ | ---- | ---- |
|  | 15 | ---- | -✕-$I_1$ | -✕-$I_2$ | -✕-$I_3$ | -✕-$I_4$ | ---- |
|  | 16 | ---- | ---- | -✕-$I_1$ | -✕-$I_2$ | -✕-$I_3$ | -✕-$I_4$ |
| II | 17 | ---- | ---- | ---- | -✕-$I_1$ | -✕-$I_2$ | -✕-$I_3$ |
|  | 18 | ---- | ---- | ---- | ---- | -✕-$I_1$ | -✕-$I_2$ |
|  | 19 | ---- | ---- | ---- | ---- | ---- | -✕-$I_1$ |

FIG.2

INVENTORS
VALDEMAR A. ALTOVSKY
PIERRE R.J. MONDON
BY Kurt Kelman
their Agent

United States Patent Office 3,162,852
Patented Dec. 22, 1964

3,162,852
RADAR APPARATUS
Voldemar A. Altovsky and Pierre R. J. Mondon, Paris, France, assignors to Societe Nouvelle d'Electronique, Paris, France
Filed Feb. 25, 1959, Ser. No. 795,425
Claims priority, application, France, Mar. 4, 1958, 759,605
2 Claims. (Cl. 343—17.1)

The present invention relates to radar apparatus in which the surrounding space is systematically scanned by an aerial giving a movable directional radiation pattern. The invention is more specifically concerned with improvements in the electromagnetic detection and localization of targets sending back a number of echoes distributed in several repetition periods of the radar system which correspond to successive scans. These echoes are located on both sides of the beam axis, being thus attenuated; but it is desirable to determine with the utmost possible swiftness and accuracy the presence and the position of a target and to represent it by one of the reflected echoes, preferably that echo which corresponds to the direction of the radiating axis of the beam and gives the optimum position of the detected target.

Means are known for making this determination but they require the operator to note, for instance, the average echo or "central echo" with the help of markers, slides, etc. which he moves on the screen of the display tube. This manual plotting is often very difficult because other echoes may appear on said screen which are not related to the detected target. Such other echoes may come from other targets, but also from noise and jamming for instance. It is highly advantageous to have the detection and the plotting of a particular echo, such as the average or central one, fully automatic in order to simplify the work of the operator and avoid the risk of error.

The object of the present invention is to provide automatic detection simultaneously with the plotting of an echo corresponding to a detected target among several echoes corresponding to the same or to other objects. This automatic plotting can be suited to particular utilization conditions. The invention permits the determination of the average echo corresponding to the optimum position of the detected object so that an echo corresponding to a jamming or a noise signal can be eliminated.

According to a feature of the invention, there is provided a memorization device comprising two groups of memory circuits in which the data gathered during a number of repetition periods of the radar apparatus are stored after they have been quantized and classified according to their subsequent utilization.

According to another feature of the invention, the number of the memory circuits is equal to that of the repetition periods involved and the quantized data which are stored in the circuits are shifted at each repetition period from one circuit to the following.

According to another feature of the invention, there is provided an analyzer circuit which tests, at each repetition period, the memory circuits and selects, according to a chosen criterion, one bit of information among all the data which have been stored.

Further objects and advantages of this invention will become apparent in the following detailed description with reference to the accompanying drawing in which:

FIG. 2 is a diagram showing the progression in the memory circuits of an information train related to a target.

Figure 1:
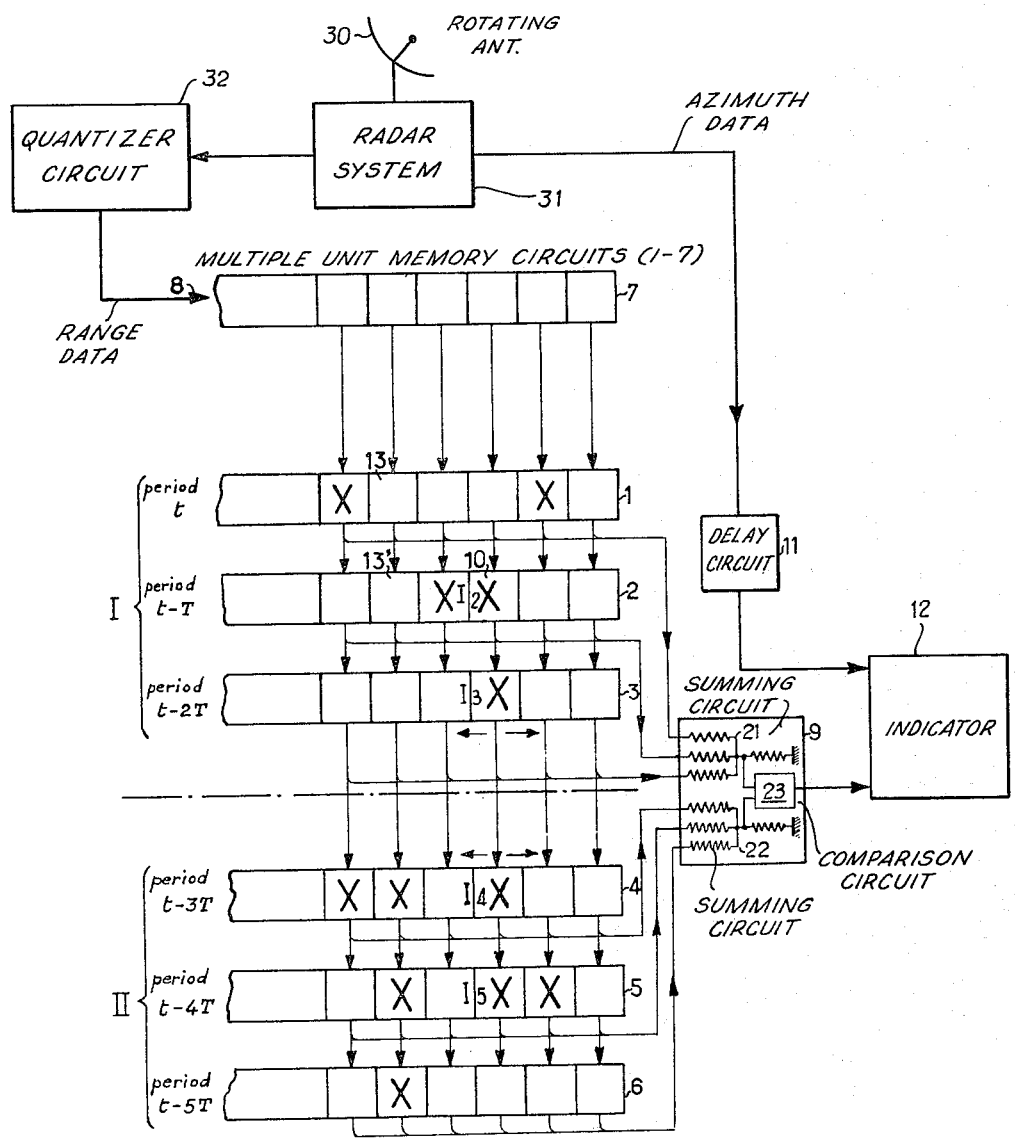
FIG. 1 is a block diagram of the storage device for the information.

As already mentioned, the invention applies more particularly to the case where an object, caught in the beam of a radar antenna 30, gives rise to several echoes whose number is simultaneously a function of the aperture angle of the beam and of its rotation speed.

In the operation of a radar station, such as the one shown at 31, it is very important to have, for each detected target, one echo which represents it alone with accuracy, rather than to have many succeeding echoes which, if numerous, tend to make the reading of the display very unreliable and further, these echoes can be mixed with other echoes coming from noises and/or jammers which should be eliminated. All these operations, effected up to now by the operator, cannot present the accuracy and safety rate which is necessary; and it is thus important to have these operations made automatic in order to prevent any risk of human error.

During a scanning of the space by the radiating beam of the antenna, several targets or objects can be detected which give rise to echoes, each one of these targets producing several echoes. The term "target" or "object" includes whatever gives echoes, i.e. a real target, noise, a fixed object etc.

During a repetition period, echo information can be measured and then quantized by circuit 32 with respect to one of the characteristic co-ordinates (distance, azimuth, height . . . ) of the objects.

The memory circuits of FIG. 1 are marked by the numerals 1 to 6 in the described example, but it is obvious that their number is not fixed and this number is defined by the maximum number of echoes which may be sent back from an object whose dimensions are limited.

Each of these memory circuits is able to store a given number of bits of information pertaining to a repetition period of the radar station, as indicated at X in the drawing.

These memory circuits, in the described example, are divided in two groups I and II, each having the same number of memory circuits. Circuit 7 receives at its input 8 the information gathered during one repetition period, e.g. data relating to the distance of the detected target from the station.

The device operates thus as follows:

During the first considered repetition period, the data are stored in the memory circuit 1; during the following period, the data now gathered in storage circuit 7 are stored in the memory circuit 1 whereas the data which were previously filed in said circuit are shifted to memory circuit 2; the same storage and shifting process occurs during the following repetition periods, so that when the $n$ chosen repetition periods are over, said number $n$ being expressed in terms of the maximum number of echoes a detected target may send back, all the gathered data are stored, the first ones received being registered in the memory circuits marked by the numerals of highest rank, and the last data being entered in the first memory circuits. The above described manner of shifting from one element to the homologous element of the next memory circuit is well understood and shift registers for providing such shifting are well known, being described, for example, in "High Speed Computing Devices" by the staff of Engineering Research Associates, Inc., McGraw-Hill, 1950, pages 297–299.

It will thus be apparent that by means of the analyzer circuit 9 there occurs at each repetition period simultaneously a shifting of the information stored in the memory circuits and a testing of the homologous elements of said memory circuits. Homologous information is information of the same value occurring in different repetition periods.

This shifting and storage process is shown in FIG. 2 for only the progression of one information train corresponding to one target.

The homologous elements of the memory circuits of the two groups I and II are marked by 14, 15 . . . 19 and the repetition periods by $T_1$, $T_2$ ... $T_6$. The information gathered during the first period is stored in a memory element 14; during the period $T_2$, the information $I_1$ is shifted to the homologous memory element 15, while the information $I_2$ is stored in 14. During the period $T_3$, $I_1$ is shifted to 16, $I_2$ to 15 and $I_3$ is stored in 14; this process goes on till the period $T_6$ occurs.

It is obvious that the distribution of the information made in circuit 7 (FIG. 1) is maintained so that in the course of time each of the different memory circuits shows in succession the same distribution of the information as the previous one.

According to the number of bits of information corresponding to the same target, one echo corresponding to an information bit can be chosen by means of an analyzer circuit 9 which receives, during the shifting occurring at each repetition period, information from all the homologous elements such as 13, 13' ... of each memory circuit.

In order to determine the central or average value pertaining to a number of bits of information related to a detected object, the analyzer circuit 9 is designed to produce a signal when, in the two groups of memory circuits I and II, the existence of the same number of homologous bits of information has been detected to provide a balanced input to circuit 9; such balancing occurs, for instance, in the presence of bits $I_2$, $I_3$, $I_4$ and $I_5$ in the symmetrically disposed memory circuits 2, 3, 4 and 5.

This result can be, for instance, obtained by using summing circuits like network 21 for the information of group I and network 22 for group II. These summing circuits sense the values of the information of the two groups, the circuit 23 providing a comparison of the corresponding information and producing a signal if the comparison is in accordance with a chosen criterion.

Each of the memory circuits corresponds to one repetition period. The information is chosen by the analyzer circuit 9 with a fixed delay which in the described example amounts to three repetition periods, that is, is equal to the number of the memory circuits which exist in each of the two groups.

If range information is stored in the memory circuits, one is able, by delaying systematically by three periods the corresponding angular information in circuit 11, to obtain at the output or indicator 12 complete information pertaining to a determined object, said object being reproduced by a single echo on the display.

It may be desired to select from all the echoes, which are gathered during a given number of repetition periods, echoes pertaining to real, moving or fixed targets, or to noise, or to non-synchronous jamming.

In the previously described example, the analyzer circuit gives the average information only when there is a definite number of homologous bits of information.

Generally speaking, the peaks of noises and non-synchronous jamming are not placed on the same spot from one repetition period to the other, their relative distances from the radar station being different. Under these conditions, the number of homologous bits of information which are analyzed by circuit 9 is not sufficient, i.e. this number does not correspond to a predetermined value and in this manner the echoes pertaining to noise and jamming are automatically eliminated.

The criteria to which the analyzer circuit 9 can be adjusted are numerous and another utilization of the process according to the invention can be mentioned. Indeed, the analyzer circuit may produce a signal as soon as it has determined a minimum number of homologous bits of information, which enables detection of an object entering the space covered by the antenna of the station, or which has simply entered a predetermined zone of it.

It is well understood that the memory circuits may be of any kind such as, for instance, a matrix of magnetic cores.

What we claim is:

1. Pulse radar apparatus comprising means for receiving echo pulses from a target and a directional movable antenna such that a target generally returns a plurality of echo pulses, means for quantizing an information characteristic of the echo pulses, a sequence of like memory circuits divided into two groups having equal numbers of memory circuits, each memory circuit having a plurality of elements representing different values, means for storing respective bits of the quantized information in respective elements of a first one of said sequence of memory circuits during each repetition period, analyzer circuit means for sensing during each repetition period homologous elements of the two groups of memory circuits and then shifting the information from any preceding memory circuit including said first one to the next succeeding one without changing the value of said information, and comparison means connected to all said memory circuits for producing an output signal in response to a symmetrical distribution of said bits on homologous elements of a like plurality of memory circuits in the two groups.

2. Radar apparatus according to claim 1, comprising an indicator connected to said comparison means, said quantized information characteristic being the range of the target, and delay means connecting the radar receiving means to the indicator for delaying azimuthal information supplied to said indicator for a number of pulse-repetition periods equal to the number of memory circuits in one group, whereby said indicator is concurrently triggered by said azimuthal information from said delay means and by said output signal from said comparison means relating to the same target.

References Cited in the file of this patent
UNITED STATES PATENTS
2,761,132    McIlwain _____ Aug. 28, 1956
FOREIGN PATENTS
1,147,248    France _____ June 3, 1957